March 31, 1964
R. R. MANDY
3,126,566
WINDSHIELD WASHER AND WIPER COMBINATION
Filed July 11, 1962
2 Sheets-Sheet 2
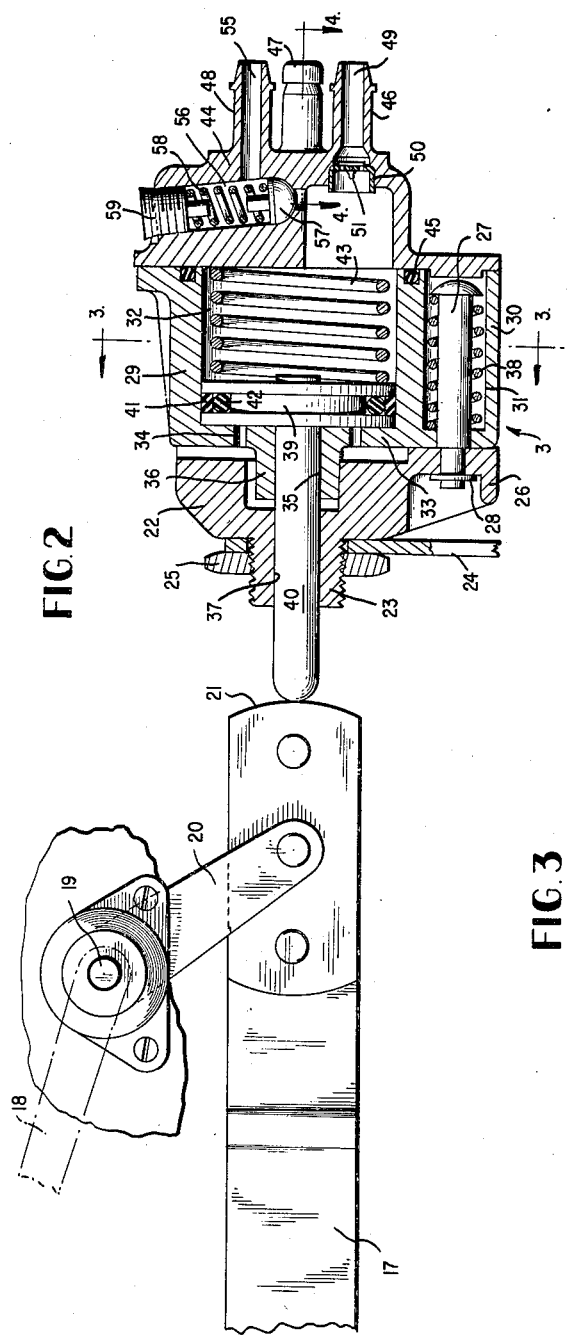
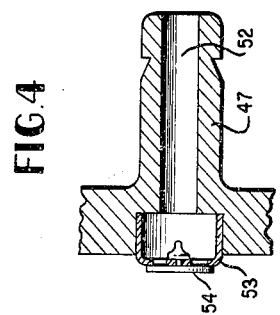
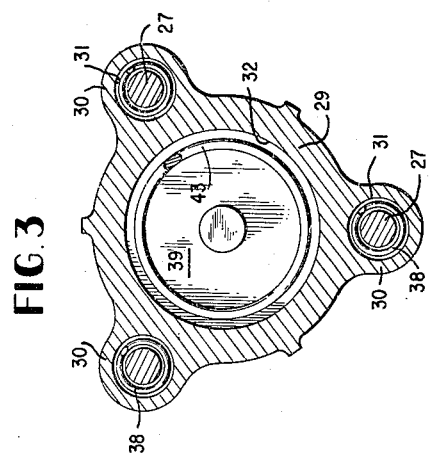
INVENTOR.
ROBERT R. MANDY
BY *Rudolph L. Lowell*
ATTORNEY United States Patent Office 3,126,566
Patented Mar. 31, 1964

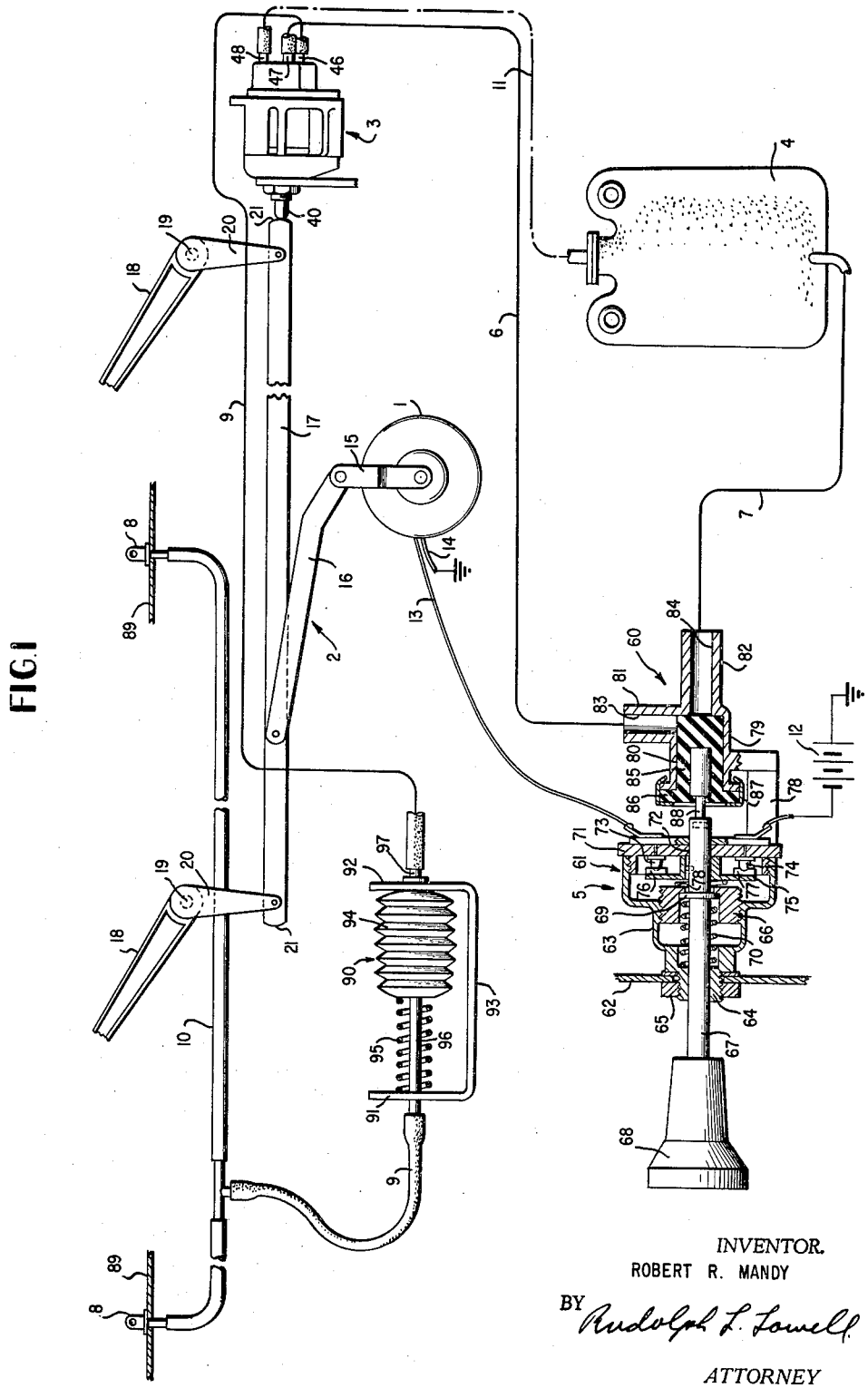

3,126,566
WINDSHIELD WASHER AND WIPER
COMBINATION
Robert R. Mandy, Detroit, Mich., assignor to The Delman Company, Cookeville, Tenn., a corporation of Tennessee
Filed July 11, 1962, Ser. No. 209,203
10 Claims. (Cl. 15—250.02)

The present invention relates to windshield cleaning systems and in particular to a novel system wherein a solvent or other liquid cleaning substance is applied to the surface of a windshield conjointly with the continuous operation of an oscillating wiper. In systems of the type concerned in the present application, a liquid spray is applied directly to the surface of the windshield by means of a fluid pump which may be driven by the continuously operating linkage of the wiper members powered by continuously operating wiper motor with the pump means being selectively connected and disconnected from the wiper linkage at the will of an operator.

In the prior art, much difficulty has been encountered in devising suitable systems for connecting and disconnecting the pumping means from the constantly operating wiper linkage. In the past, many systems have been proposed which involve the use of an electrical relay, solenoids and Bowden wire cables and the like which have proved undesirable from the standpoint of maintenance and cost of installation. Other problems have been encountered such as providing suitable means for relieving the pump and fluid conduits in case of freeze-up and also in the provision of a constant spray of fluid against the windshield, as opposed to intermittent surges or pulses produced by conventional pumping systems. It has also been desirable to devise a washer pumping system wherein the pump unit may be mounted separately from the wiper motor and gear housing to be driven, instead, by the operating linkage of the wipers themselves. Certain advantages may be derived from such a system in that the washer system may be adapted to be applied to existing wiper systems without the necessity of altering the wiper motor and gearing arrangement. With such arrangement, the pump unit may also be removed for repairs or replacement without disturbing the wiper motor or linkage. In devising such a system, it will also be possible to manufacture the pump unit and the wiper motor linkage without the necessity of interdependent structure or fittings between the pump unit and the wiper motor and linkage. The present invention is aimed at alleviating the problems encountered in the prior art, while, at the same time, providing a simple and efficient system requiring minimum attention from the driver of the automobile.

The primary object of the present invention is therefore to provide a windshield washing and wiping combination wherein a liquid spray is provided by a separately mounted fluid pump driven directly by contact with the continuously operating windshield wiper linkage, with means being provided for the operator to selectively connect and disconnect the pump means from the wiper linkage.

A further object of the present invention is to provide a windshield washer and wiper combination of the type mentioned wherein the separately mounted pump means may be selectively connected and disconnected from the continuously operating wiper linkage without the use of complicated relays, solenoids or Bowden wire cables or the like.

A further object of the present invention is to provide a windshield washing system and pump means of the type discussed wherein a constant flow or spray can be applied to the windshield during the operation of the washing system.

A further object of the present invention is to provide a combination windshield washer and wiper system of the type described wherein provision is made for the relief of the pumping means and the fluid conduits in case of a freeze-up or blocking of the fluid conduits or pump means.

A further object of the present invention is to provide a pumping means of the reciprocating type for a windshield washing system wherein the reciprocating pump member is driven by contact with a constantly reciprocating portion of the windshield wiper linkage.

A still further object of the present invention is to provide a windshield washer and wiper system wherein an operator may cause the contact between the wiper linkage and the reciprocating pump member to be terminated by the operation of a valve on the suction side of the pump means to provide a vacuum seal to hold the pump piston away from the wiper linkage.

The means by which the foregoing objects and other advantages, which will be apparent to those skilled in the art, are accomplished are set forth in the following specification and claims and are illustrated in the accompanying drawings dealing with the preferred embodiment of the invention. Reference is now made to the accompanying drawings, in which:

FIGURE 1 is a diagrammatical representation of the over-all system showing the location of the various components and the details of the control valve for the washer system;

FIGURE 2 is a view showing the pump and wiper linkage combination with the pump being illustrated in cross-section; FIGURE 3 is a further cross-section view of the pump taken along lines 3—3 of FIGURE 2; and FIGURE 4 is a cross-sectional detail taken along lines 4—4 of FIGURE 2.

Referring now to the drawings wherein like reference numerals are used to indicate identical parts in the various views, the system includes a conventional electric motor 1 with its associated wiper linkage 2. A fluid pump unit is indicated by the reference character 3 and is connected on its inlet side to a fluid solvent reservoir 4 through a combination switch and valve unit 5 by means of conduits 6 and 7. The outlet side of the pump unit 3 is in turn connected to nozzles 8 by means of conduits 9 and 10. The pump unit 3 has a further connection with the reservoir 4 by means of a by-pass conduit 11.

The details of the wiper motor linkage and washer pump combination will be first described, with relation to the details shown in FIGURES 1 and 2. The wiper motor 1 is operated by means of a source of electrical energy 12 through the switch and valve means 5 and the electrical leads 13 and 14 as shown in FIGURE 1. The wiper motor may be selectively operated by means of a switch and valve combination 5, details of operation of which will be presently described. The wiper motor 1 in practice will also include a suitable gear housing and gearing arrangement for the purpose of transmitting a constant drive to the oscillating wiper control arm 15. The exact details of the gearing arrangement for driving the wiper control arm 15 are not shown and form no part of the present invention and may be accomplished in any desired manner by means of any suitable gearing transmission which is commercially available. The only critical requirement for the present combination is the wiper control arm 15 which is to be constantly oscillated during the operation of the wiper motor 1.

A connecting link 16 is pivoted at one end to the control arm 15 and at the other end to a reciprocating wiper bar 17 to enable the oscillating motion of the control arm 15 to be converted to a reciprocating motion produced in the connecting bar 17 in a well known manner. The connecting bar 17 will extend between the two windshield wiper arms 18 which are pivoted to the automobile body at 19 with the connecting bar 17 being pivoted to crank arms 20 to convert the reciprocating movement of the bar 17 to oscillating the movement of the wipers 18 and the cranks 20 about the pivots 19. In actual practice, the wiper arms 18 will be fitted with suitable wiper members which contact the windshield of the automobile and the pivot means 19 will be carried by the body of the automobile. With this arrangement, it will be obvious that the oscillating motion of the wiper control arm 15 will be transferred to the members 18 through the reciprocating bar 17 in a well known manner. The oscillating bar 17 will further include cam surfaces 21 on one or both of its terminal end portions for the purpose of contacting a pump piston in a manner to be described. Although only one end of the bar 17 is illustrated as being in contact with a pump piston in FIGURE 1, it will be obvious that both ends of the bar 17 could be utilized in the event that more than one pump unit were utilized.

Referring now to FIGURE 2, the pump unit 3 includes a stationary mounting base 22 which has a hollow threaded projection 23 for reception into a suitable opening in a stationary mounting bracket 24. The pump base 22 is then securely tightened against the bracket by means of a lock unit 25. The base structure 22 further includes spaced projections 26 about its outer periphery for the reception of mounting posts 27, the ends of which pass through suitable holes in the projections 26 and are retained in position by any suitable means such as snap rings 28. The posts 27 serve to locate and maintain the hollow pump cylinder 29 in place on the pump base 22. As viewed most clearly in FIGURES 2 and 3, the pump cylinder is generally cylindrical in form and includes three hollow projections 30 around its outer surface which correspond to the projections 26 on the pump base 22. Each of the projections 30 includes a bore 31 for the reception of the posts 27 with the opening at the bottom of the bores 31, as shown in FIGURE 2, being of substantially the same diameter as the posts 27 to allow the posts to pass therethrough. In further detail, the bores 31 are open at the top portion to enable the posts 27 to be inserted within the bores 31 and pass through pump base 22 to be locked in position. The pump cylinder further includes the cylinder bore 32 for the reception of a pump piston and a bottom portion 33 which serves to substantially close off the bottom of the cylinder bore. The bottom portion 33 is provided with vent openings 34 as well as a central opening 35 to allow the movement of the piston rod. A cylindrical projection 36 extends outwardly from the bottom 33 into the body of the pump base 22. The projection 36 with its opening 35 serves to further align the pump cylinder 29 on the base 22 and coacts with the bore 37 to provide a guide for the reciprocating pump piston.

In mounting the assembly thus far described, the pump base 22 will be inserted into the opening of bracket 24 and locked into place by the lock nut 25 to securely position and retain the base 22 in place. The pump cylinder 29 will then be positioned against the base 22 with the projections 30 coinciding with the projections 26 on the base 22. Helical springs 38 will then be fitted over the posts 27 to bear against the heads of the posts with the spring and post assemblies then being placed in the bores 31 with the ends of the posts 27 passing through the openings in the projections 26. The helical springs 38 are formed to provide a predetermined bias between the pump cylinder 29 and the base 22 upon depressing the posts 27 and locking the same in place by means of the snap rings 28.

A pump piston 39 is located within the bore 32 and includes a cylindrical piston rod 40 which extends outwardly through the opening 37 in the projection 23 and through the bore 35 in the pump base. The piston rod 40, shown in FIGURE 2, has a spherical shaped end portion which is designed to be contacted by the cam surface 21 on the reciprocating bar 17. The piston rod 40 is preferably constructed of hard nylon or its equivalent to produce a long-wearing, noiseless bearing surface. As indicated in FIGURE 2, the piston rod 40 will extend a substantial distance beyond the end of the threaded projection 23 so as to be contacted by the moving bar 17 as the bar 17 approaches the end of its movement to the right as viewed in FIGURE 2. The pump unit 3 will be so mounted with relation to the moving bar 17 that the piston rod 40 and the piston 39 of the pump cylinder will be moved the length of a full piston stroke by the cam portion of the bar 17 at the end of its right-hand movement as shown in FIGURE 2. The piston 39 is fitted with a suitable Teflon seal 41 which is backed up by a sutiable O-ring seal 42. The seal 41 and the O-ring 42 are contained in a suitable peripheral channel about the piston 39. To complete the structure of the pump cylinder, a helical return spring 43 is seated against the working face of the piston 39 and bears against a cylinder cover 44 which is secured to the open top of the cylinder 29 in any suitable manner so as to close off the bores 31 and the central bore 32 of the cylinder. Any suitable clamping means or screw fastenings means may be utilized to secure the cover 44 to the cylinder 29 and an annular sealing ring 45 may be provided to perfect a fluid-tight seal between the cover and the cylinder in a well known manner.

The cover 44 is fitted with three hose nipples 46, 47 and 48 to provide the necessary attaching means for the hose members or conduits of the system. The nipple 46 includes an outlet passage 49 which is designed to register with a hose or a conduit 9 which is fitted over the nipple 46 as shown in FIGURE 1. Mounted within the outlet passage 49 is a check valve unit which includes a metallic seating ring 50 and a flexible seating flap 51 which is snapped into engagement with the seating ring 50. The seating ring 50 may be force-fitted so as to securely fasten within the outlet passage 49.

The nipple 47 is designed to receive the inlet hose or conduit 6 as shown in FIGURE 1 with the nipple 47 further including an inlet passage 52 which also registers with the internal portion of the cover 44 and the bore 32. The details of the nipple 47 and the passage 52 are illustrated in FIGURE 4. The inlet passage 52 further includes a check valve seating ring 53 and the valve flap 54 which is identical in structure to the seating ring 50 and the flap 51 of the outlet passage 49, except for the fact that seating ring 53 and the flap 54 are so positioned in the inlet passage 52 to permit inlet flow of liquid and to prevent a back flow through the inlet passage. This arrangement is clearly shown in FIGURE 4. The nipple 48 is designed to receive the bypass conduit or hose member 11 as shown in FIGURE 1 and includes a bypass passage 55 for the cover 44. The bypass passage 55 is connected to the interior of the cover 44 and the bore 32 through a chamber 56 which contains a spring pressed check valve 57 which is held in the closed position by the helical spring 58, the bias of which may be adjusted by means of the screw plug 59.

The bypass conduit or hose 11 connects the bypass passage 52 and the nipple 47 with a solvent reservoir 4. The reservoir 4 is illustrated as a plastic container which is designed to be fastened to an automobile at any convenient spot beneath the hood. It will be understood that the reservoir 4 may take any suitable form such as a glass or metallic container or any other style container available for that purpose. It will also be noted that the reservoir 4 will have a suitable vent to atmosphere to allow the liquid therein to be displaced by the pump unit.

Looking now to the combination switch and valve indicated generally by the reference character 5 in FIGURE 1, said unit embodies a valve 60 and a switch member 61 with the entire combination unit being designed to be mounted on the dashboard 62 of an automobile so as to be convenient to the driver.

Referring first of all to the switch portion 61 of the unit 5, a bell-shaped switch housing 63 is securely affixed to the dashboard 62 by means of a threaded shoulder 64 and a lock nut 65 in a well known manner. Located within the housing 63 is a guide member 66 which has a central opening which cooperates with the central opening in the shoulder 64 to provide a guide for the rotatable and reciprocable operating rod 67. The rod 67 further includes a knob 68 and an annular flange 69 located on the shank of the rod and spaced from the knob 68. A helical compression spring 70 surrounds the rod 67 and seats at one end against the flange 69 and at the other end against the shoulder 64. With this arrangement, it will be readily apparent that the rod 67 may be reciprocated within the housing 63 and may also be rotated in either direction within its mounting. A backing plate 71 is fitted to the housing 63 by any convenient means such as the screw threaded attachment shown in FIGURE 1. The backing plate 71 includes a central opening 72 to accommodate the rod 67 and two contact elements 73 and 74 which are in turn electrically connected to the motor lead 13 and to the lead wire of the electrical source 12 respectively. To complete the structure of the switching portion of the unit 5, a bridging element 75 is mounted on the rod 67 by means of a key and slot arrangement as illustrated in FIGURE 1 for the purpose of allowing the rod 67 to reciprocate with relation to the member 75 while at the same time allowing the operator to control the rotary position of the member 75 by rotating the knob 68. The member 75 further includes contacts 76 and 77 which cooperate with contacts 73 and 74 respectively of the backing plate 71 for the purpose of energizing the wiper motor 1 when these contact members are in registry as illustrated in FIGURE 1. A spring member 78 maintains the bridging member 75 in position against the backing plate 71 at all times and prevents axial movement of the member 75 when the rod 67 is reciprocated. With this switching arrangement, it will be understood that the operator may energize the wiper motor 1 at will by rotating the knob 68 and the wiper motor will continue to operate as long as the switch contacts remain in the position shown in FIGURE 1.

The valve portion 60 of the unit 5 is rigidly connected to the switch 61 by means of an integral connecting arm 78 carried by the backing plate 71 and securely attached to the valve body 79. The connecting arm may be connected to the valve body 79 by any suitable means such as welding, brazing or screw attaching means. The valve body 79 is cylindrical in form and includes a central bore 80 and two hose connections 81 and 82 with the connection 81 being connected to the hose 6 leading to the pump 3 and the connection 82 being connected to a hose member 7 which is in turn connected to the reservoir 4. The connection 81 provides an outlet passage 83 for the valve body and the connection 82 provides an inlet passage 84 for the valve body.

Mounted within the bore 80 in the valve body is a resilient valve seating member 85 which normally fills the inside of the bore 80 and includes an annular flange 86 which is clamped to the body by means of a clamping washer 87 so as to prevent removal of the resilient valve seating member 85 from the bore 80. The seating member 85 is composed of a suitable highly resilient material, such as rubber, or its equivalent. The seating member 85 is molded about an operating stem 88 which is connected to the operating rod 67. The connection between the rod 67 and the valve stem 88 is designed to allow the rod 67 to be rotated with respect to the stem 88 while at the same time providing longitudinal movement of the stem 88 with the rod 87 upon actuation by the operator. Such a connection is illustrated in FIGURE 1 wherein the rod 67 has an end portion which loosely surrounds a flange on the stem 88. This type of joint is subject to many different designs such as the reverse construction from that shown in FIGURE 1, a ball and socket joint or the like. With relation to the connection between the operating stem 88 and the seating member 85, the only essential attribute is a rigid connection between the valve stem 88 and the material of the valve seating member 85 in a longitudinal direction. This connection may also take various forms in addition to that shown. As aforementioned, the means for retaining the resilient member 85 within the bore 80 comprises a clamping washer 87 which contacts the flange 86 of the resilient member and a portion of the valve housing. As illustrated in FIGURE 1, the washer 87 contacts only the flange portion of the resilient member 85 so as to allow the resilient material of the member 85 to be deformed through the central portion of the washer 87 upon longitudinal movement of the stem 88 to the left as viewed in FIGURE 1. The purpose of this arrangement will now be described.

The seating member 85 is illustrated in its normally closed position in FIGURE 1, wherein the member 85 covers the inlet passage 84 and the outlet passage 83 of the valve body to thus prevent any fluid from passing from the reservoir 4 to the pump member 2. When it is desired to open the passage between the reservoir and the pump, the operator pulls on the knob 68 to move the rod 67 and the stem 88 of the seating member to the left. This will result in deformation of the resilient member 85 through the opening in the washer 87 concurrent with the withdrawal of the seating member from the closed position, as shown in FIGURE 1, to an open position so as to uncover the passages 83 and 84 to allow fluid passage therethrough from the reservoir 4 upon operation of the pump. It will also be noted that the pulling force applied to the knob 68 and rod 67 is resisted by the bias of spring member 70 so that the passages 83 and 84 will be connected only as long as the operator maintains the pulling force on the rod 67. Immediately upon releasing the knob 68, spring 70 will return the operating rod 67 to the position shown in FIGURE 1, wherein the passages 83 and 84 will both be closed off by the resilient material of the seating member 85. The actuation of the operating rod 67 and the seating member 85 just described will not interfere with the position of the bridging member 75 so that the continuous operation of the wiper motor will not be affected by the operation of the valve unit 60.

Looking now to the apparatus associated with the outlet nipple 46 of the pump 3, the conduit or hose 9 conveys the pressurized fluid from the pump 3 to a second conduit 10 which normally has two spray nozzles 8 connected to its terminal ends. The number of nozzles is, of course, not limited to two, and it will be understood that any number of nozzles such as nozzles 8 may be serviced by the conduit 10, and these nozzles will normally be connected to the surface 89 of the automobile body adjacent a windshield or other window surface of the automobile which is to be cleaned. In standard practice, the nozzles 8 are located closely adjacent the oscillating wiper members and are so constructed to provide a fan type spray over a substantial area of the windshield or window which is contacted by the wiper members.

Located in the outlet fluid conduit 9 between the pump unit 3 and the spray nozzles 8, is a surge chamber assembly or pulse converter 90 which serves to convert the pulsating pressure from the pump unit 3 to a steady stream of liquid under pressure to the spray nozzles 8. In structure, the pulse converter 90 comprises a U-shaped frame having upstanding legs 91 and 92 and a bottom connecting member 93. An expandable bellows 94 is mounted between these upstanding legs 91 and 92 and bears against one of the legs 92 at one end and against a compression spring 95 at the other end.

The compression spring 95, in turn, seats against the opposite leg 91 of the U-shaped member. The left-hand side of the bellows 94, as illustrated in FIGURE 1, has a rigid pipe 96 extending therefrom which passes through a suitable hole in the leg 91 and is permitted to reciprocate with relation to the leg 91. The end of the pipe 96, remote from the bellows 94, is in turn connected to one portion of the conduit 9. The right side of the bellows 94 may be rigidly affixed to the leg 92 and has a second rigid pipe 97 extending therefrom and connected to the second portion of the conduit 9. The U-shaped frame, comprising the members 91, 92 and 93 may be rigidly connected to the body of the automobile beneath the hood or may, in the alternative, be merely supported by any portion of the automobile beneath the hood since there will be no forces tending to translate the U-shaped member and the only reaction will be between the legs 91 and 92 of the U-shaped member. During operation of the reciprocating pump 3, successive pressure pulses or surges will be produced and as each pulse is received the bellows 94 will expand between the legs 91 and 92, thus compressing the spring 95. After each successive pulse, the pressure from the pump 3 will drop to zero and, with the drop in pressure, the spring 95 will expand to again compress the bellows 94 resulting in a discharge of liquid from the bellows. In this manner, the pulse converter produces pressure pulses within the conduit 9, with the pulses produced by the converter occurring between the pump pulses, thus resulting in a steady flow of liquid under pressure to the nozzles 8. This action will, of course, result in a steady stream or spray from the nozzles 8 instead of the conventional squirts or intermittent spray which would normally result from the reciprocating pump unit 3, if utilized alone.

Having described the details of the washer and wiper system, including the details of construction of each of the components of the system, and with this structure in mind, the over-all operation of the system will now be described with the system being applied to the windshield of an automobile in a conventional fashion. In the event of inclement weather conditions, the driver of the automobile first rotates the knob 68 of the switch and valve unit 5 to energize the electric wiper motor 1 in the manner previously described with the resulting oscillation to the wiper arm 15 and the transfer of motion from the oscillating arm 15 to the oscillating wipers 18. As previously described, the bear 17 which connects the crank arms 20 will be caused to reciprocate back and forth in the process of transferring the oscillation of the arm 15 to the wiper members 18. This operation constitutes a normal function of a wiper system and, in the present invention, this function may be carried out by a simple rotation of the control knob 68 without initiating or disturbing the windshield washer system involved. The primary purpose of the present invention is the utilization of the apparatus described during other periods when the windshield is covered with road dirt or other material so as to obstruct the motorist's vision. The wiper motor 1 is first energized as described, with the position of the operating rod 67 being in its normal position, as illustrated in FIGURE 1, so as to prevent passage of liquid from the conduit 7 and the reservoir 4 to the conduit 6 connected to the inlet side of the pump unit 3. With the operation of the wiper motor 1, the connecting bar 17 will begin in its reciprocating motion as described. As soon as the cam surface 21 of the bar 17 contacts the piston rod 40, the piston 39 will be moved its full stroke as the bar 17 continues to the end of its stroke prior to reversing. The piston 39 will thus expell whatever liquid or air is present in the pump cylinder past the check valve 50 and into the conduit 9. The fluid present in the pump cylinder will flow through the perforations in the seating ring 50 and past the flexible flap 51 with back flow being prevented by the closing of the flap 51 over the perforations. Bearing in mind that the inlet conduit 6 of the pump is sealed by the seating member 85, the return spring 43 will be ineffective to return the piston 39 to the position shown in FIGURE 2, against the vacuum seal thus provided. It is apparent that as long as the inlet conduit 6 is blocked off from the reservoir by the member 85, the oscillating wiper system will operate in a conventional manner.

With the wiper motor 1 in operation and upon the desire of the motorist to provide a spray of liquid or solvent to the windshield, a pulling force is applied to the operating rod 67 to deform the sealing member 85 to thus connect the passages 83 and 84 and allow the liquid or solvent in the reservoir 4 to flow to the inlet passage 6 of the pump and past the inlet check valve 53, 54. This action is, of course, accomplished without disturbing the operation of the wiper motor 1. The reservoir 4 is, of course, open to atmosphere, as explained, to allow the flow of solvent through the valve unit 5 and to the inlet side of the pump 3. Upon opening of the seating member 85, the return spring 42 of the pump returns the piston 39 to the position as shown in FIGURE 2 in which the piston rod 40 is contacted by the cam face 21 of the reciprocating bar 17. With the valve seating member 85 in its open position and with the continuous operation of the bar 17, the pump piston 39 will be operated in a well known manner to draw the liquid solvent through the inlet conduit 6 and to discharge the liquid under pressure through the outlet conduit 9 to spray nozzles 8. The liquid under pressure will be delivered to the pulse converter unit 90 and will be converted into a steady pressurized flow to the spray nozzles 8 as previously described.

As soon as the operator decides that enough liquid has been sprayed onto the windshield, he needs only to release the knob 68 and the return spring 70 will again allow the seating member 85 to close off the passages 83 and 84 from the reservoir. With the suction side of the pump 3 closed, the piston member 39 will again be held in position at the end of its stroke, with the piston rod 40 being out of reach of the reciprocating cam face 21 on the bar 17, thus terminating the spray on the windshield.

It will be apparent that the windshield washer system may be turned off and on at will by the motorist during the continuous operation of the wiper motor 1 without disturbing the operation of the wiper motor and attendant linkage and without the necessity of separate switches, solenoids, relays or Bowden wire connections. It will also be apparent that the wiper motor 1 may be initially energized with the seating member 85 being in its open position to give a substantially concurrent operation of the oscillating wipers and the liquid spray. If at any time the nozzle members 8 should become clogged with foreign matter, or in the event the hose members 9 become obstructed, a safety bypass flow is provided by means of a spring-pressed bypass valve 57 which will be set to open at a predetermined high pressure above the normal pressure produced by the reciprocating pump piston 39. In the event of a clogging of nozzles or the obstruction of the conduit 9, the fluid will simply be channeled past the valve 57 and through the bypass passage 55, the conduit 11, and back to the reservoir 4 without damage to the conduit, hoses or pump mechanism.

The novel pump unit 3 of the present invention is also equipped with emergency relief means to prevent damage to the pump mechanism and to the reciprocating and oscillating wiper linkage in the case of a complete freeze-up of the pump unit. During periods of extreme cold weather, it has not been uncommon for washer systems of the prior art to be damaged when the water or liquid solvent within the system becomes frozen. According to the present invention, the three spring members 38 which bias the pump cylinder 29 against the pump base 22 will be precalibrated so as to allow the entire pump cylinder 29 to separate from the pump base 22 in case the liquid within the chamber or bore 32 becomes solidified so as to prevent the movement of the piston 39. The combined force exerted by the three springs 38 will be set so as to be greater than the resistance on the pump piston 39 provided by the return spring 43 and the pumping operation during normal periods, but will yield upon freezing of the pump piston. In calibrating the force of these three springs 38, such combined force will also be set at a value which will allow reciprocation of the entire pump cylinder 29 and the piston rod 40 without damage to the constantly reciprocating connecting bar 17 and the associated wiper linkage. In the event that a free-up does occur, the driving bar 17 will simply operate to reciprocate the entire pump cylinder until the frozen liquid is melted.

Having thus described the details of the construction and the operation of the present invention, it will be readily appreciated by those skilled in the art that the present invention provides novel and useful improvements in washer and wiper combination systems of the types described. The arrangement and types of structural components utilized within this invention may be subjected to numerous modifications well within the purview of this invention and applicant intends only to be limited to a liberal interpretation of the specification and appended claims.

Having thus described the invention, what is claimed as new and desired to be secured by Letters Patent is:

1. A windshield cleaning system comprising in combination, a wiper unit including electrical motor means, pivoted wiper members, linkage means for transferring the drive from said motor to said wiper members, said linkage means including a reciprocating connecting bar having a cam surface thereon, a washer unit including pump means, a source of liquid, spray nozzles mounted adjacent said wiper members, a first conduit means connecting said pump to said source, and a second conduit means connecting said pump to said nozzles, said pump means further including a reciprocating member for displacing liquid from said source to said nozzles, said reciprocating member being adjacent said cam surface to be driven thereby, and a combination valve and switch unit located in said first conduit, whereby said combination unit may be operated to selectively control the operation of said wiper motor and said first conduit may be closed off by said valve to provide a vacuum holding force on said reciprocating member to hold said member out of contact with said cam surface.

2. The combination according to claim 1 wherein a spring biased expandable surge chamber is connected to said second conduit to convert the intermittent pressure pulses of said pump means to a steady pressure fluid flow to said spray nozzles.

3. The combination according to claim 1 wherein said pump means further includes a rigidly mounted base and a movable pump cylinder for receiving said reciprocating member with means being provided to resiliently bias said cylinder against said base, whereby said cylinder will move away from said base against said bias under the force of said reciprocating connecting bar and cam surface upon freezing of said reciprocating member with relation to said cylinder.

4. A windshield cleaning system comprising, a washer unit including pump means having a reciprocating member to displace liquid onto an associated windshield, a wiper unit including selectively operable motor means, pivoted wiper members, linkage means for transferring the drive from said motor to said wiper members, said linkage means including a reciprocating connecting bar having a cam surface thereon and contacting said reciprocating member to operate said pump means concurrently with said wiper unit, and manually operated means for selectively closing off the suction side of said pump to provide a vacuum holding force, whereby said reciprocating member is held out of contact with said reciprocating bar and said cam surface.

5. A windshield cleaning system comprising, a source of fluid, pump means including a reciprocating member to displace fluid from said source onto an associated windshield, wiper motor means, pivoted wiper members, linkage means for transferring the drive from said motor to said wiper members, said linkage means including a reciprocating connecting bar having a cam surface thereon for contacting said reciprocating member to operate said pump means concurrently with said linkage, and means for selectively closing off the suction side of said pump means whereby said reciprocating member is held out of contact with said cam surface.

6. The combination according to claim 5 wherein a spring biased expandable surge chamber is connected to the outlet side of said pump means to convert the intermittent pressure pulses of said pump means to a steady presure fluid flow to said spray nozzles.

7. The combination according to claim 5 wherein said motor means constitutes an electrical motor and wherein said means for closing off the suction side of said pump means comprises a combination valve and switch unit located between said pump means and said fluid source, whereby said combination unit may be operated to selectively control the operation of said motor and the suction side of said pump means may be closed off to provide a vacuum holding force on said reciprocating member to hold said member out of contact with said cam surface at the will of an operator.

8. The combination according to claim 5 wherein spring biased lost motion means is incorporated within said pump means to permit movement of said reciprocating member by said cam surface in the event said reciprocating member becomes frozen with respect to the pump means.

9. A windshield cleaning system comprising, a source of fluid, pump means including a reciprocating member to displace fluid from said source onto an associated windshield, inlet and outlet conduit means for connecting said pump means to said source and to said windshield wiper motor means, pivoted wiper members, linkage means for transferring the drive from said motor to said wiper member, said linkage means including a reciprocating connecting bar having a cam surface thereon for contacting said reciprocating member to operate said pump means concurrently with said linkage means and valve means connected to said inlet conduit means for selectively closing off said inlet conduit means, whereby said reciprocating member is held out of contact with said cam surface by a vacuum force.

10. The combination according to claim 9 wherein spring biased lost motion means is incorporated within said pump means to prevent movement of said reciprocating member by said cam surface in the event said reciprocating member becomes frozen with respect to the pump means.

References Cited in the file of this patent

FOREIGN PATENTS 860,087   Great Britain _____ Feb. 1, 1961